United States Patent
Couasnon

[11] Patent Number: 5,918,847
[45] Date of Patent: Jul. 6, 1999

[54] SLIDE LOCKABLE POSITION FOR AUTOMOBILE VEHICLE SEATS

[75] Inventor: Christian Couasnon, Flers, France

[73] Assignee: Bertrand Faure Equipements S.A., Boulogne Cedex, France

[21] Appl. No.: 08/713,716

[22] Filed: Sep. 13, 1996

[30] Foreign Application Priority Data

Sep. 16, 1995 [FR] France ................................... 95 11424

[51] Int. Cl.⁶ .................................................. F16M 13/00
[52] U.S. Cl. ........................................ 248/430; 297/344.1
[58] Field of Search ............................ 297/344.1, 463.1, 297/337; 248/430, 429

[56] References Cited

U.S. PATENT DOCUMENTS

| | | |
|---|---|---|
| 2,636,545 | 4/1953 | Johnson . |
| 4,190,226 | 2/1980 | Letounoux et al. . |
| 4,756,503 | 7/1988 | Fujita . |
| 4,781,353 | 11/1988 | Nihei et al. . |
| 5,150,871 | 9/1992 | Negi et al. . |

FOREIGN PATENT DOCUMENTS

| | | |
|---|---|---|
| 6308833 | 12/1927 | France . |
| 117131 | 8/1984 | France . |
| 6144037 | 3/1986 | Japan . |
| 404419 | 12/1965 | Switzerland . |
| 413397 | 7/1934 | United Kingdom . |

*Primary Examiner*—Milton Nelson, Jr.
*Attorney, Agent, or Firm*—Pollock, Vande Sande & Amernick

[57] ABSTRACT

The slide (1) consists of a first (3) and a second (5) section sliding in relation to each other in a longitudinal direction and a lock (10) including locking teeth (16) which mate with notches (57) made in the second section (5) to ensure locking. The lock (10), which is formed of a part in a flexible blade, is securely attached to the first section (3) in an attachment area (13) far from the said teeth and it is elastically deformable in an intermediary area (12) located between the attachment area and the teeth. Unlocking is achieved by pivoting the lock along a longitudinal axis by elastic deformation of the said intermediary area. Applicable especially to the slides of automobile vehicle seats.

19 Claims, 4 Drawing Sheets

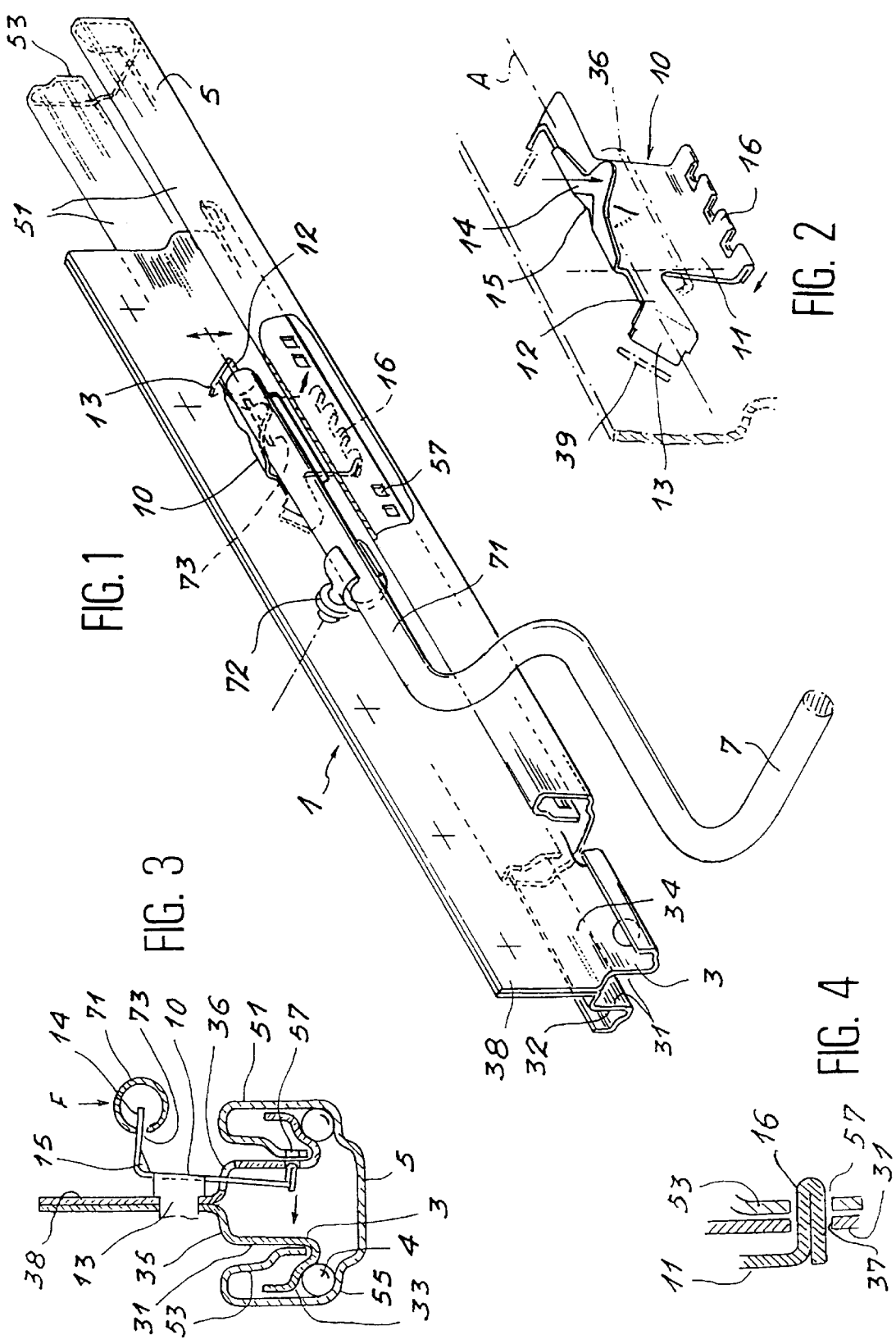

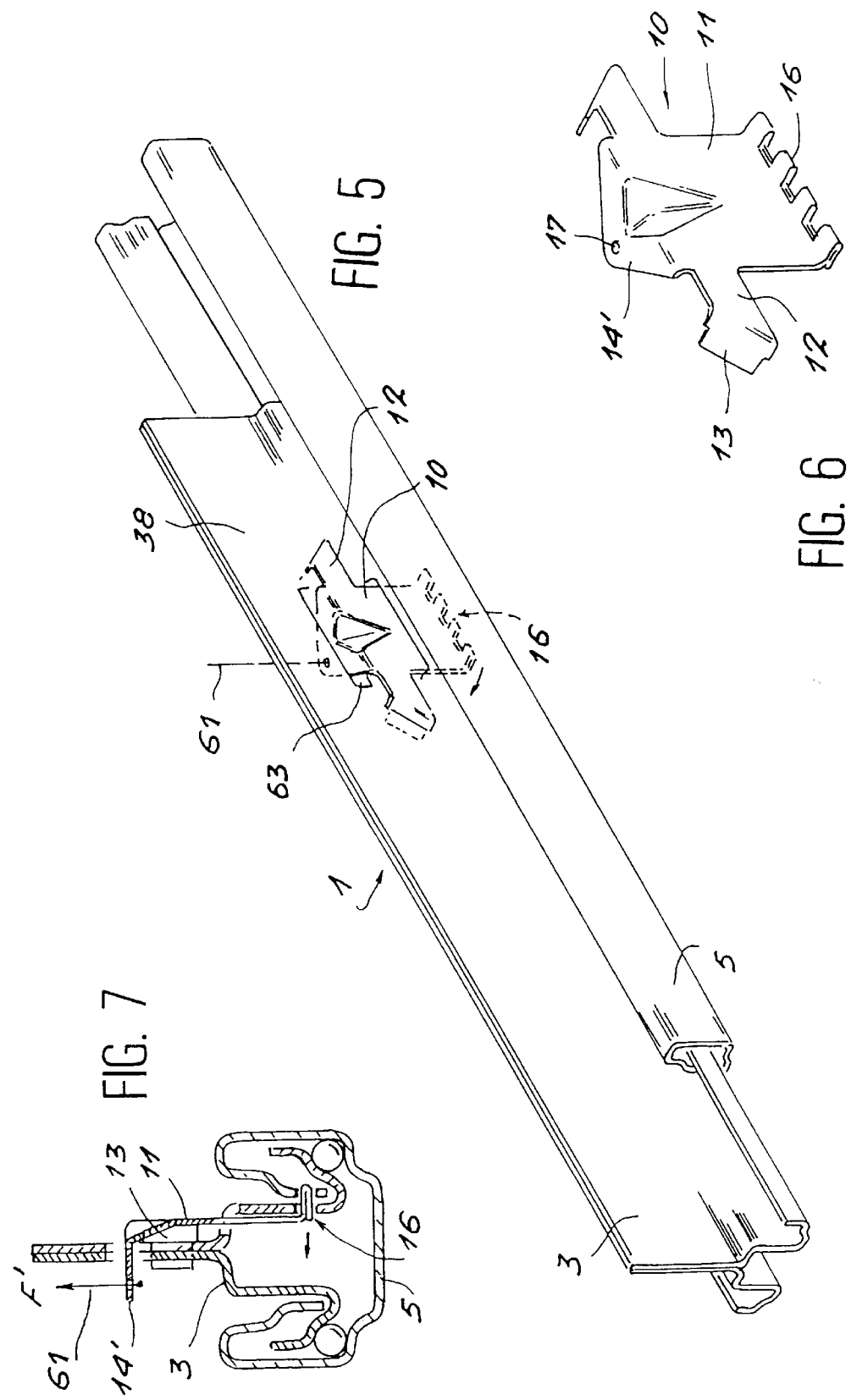

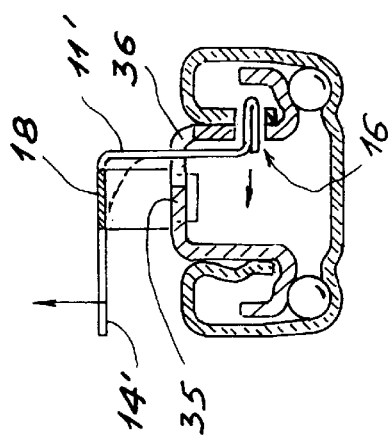
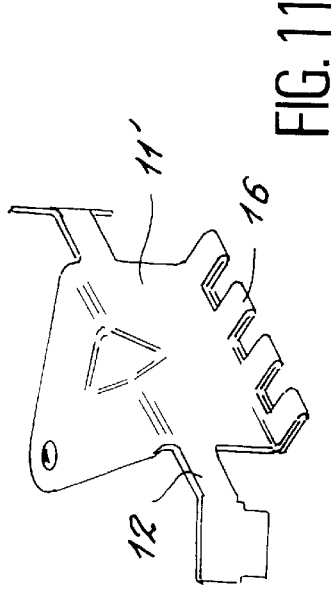
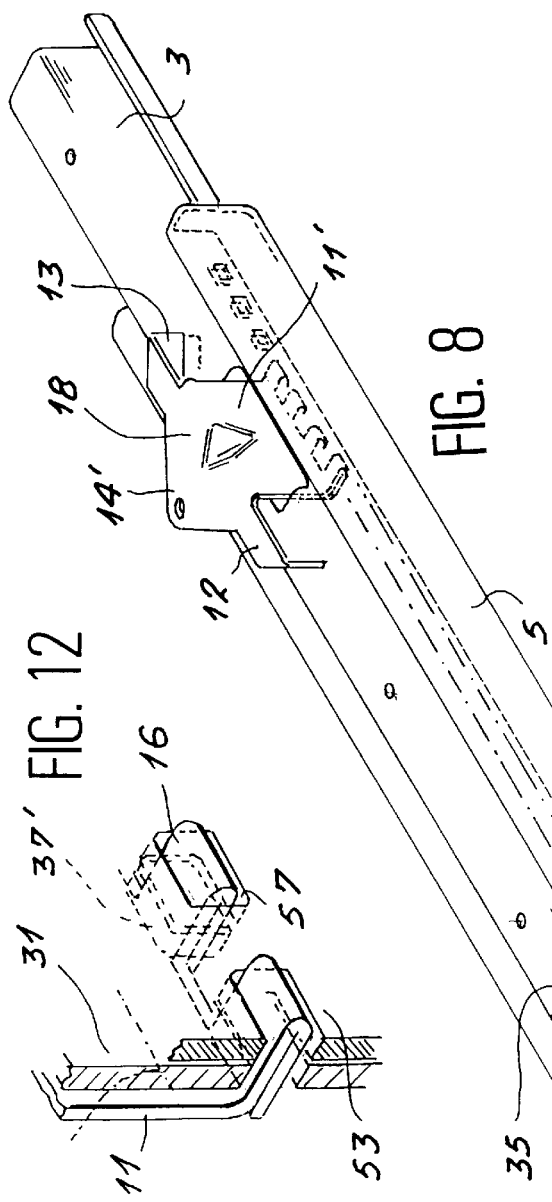
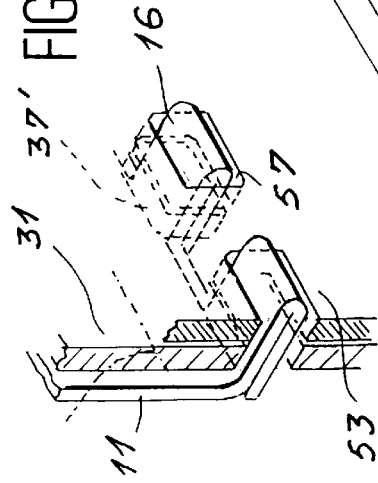
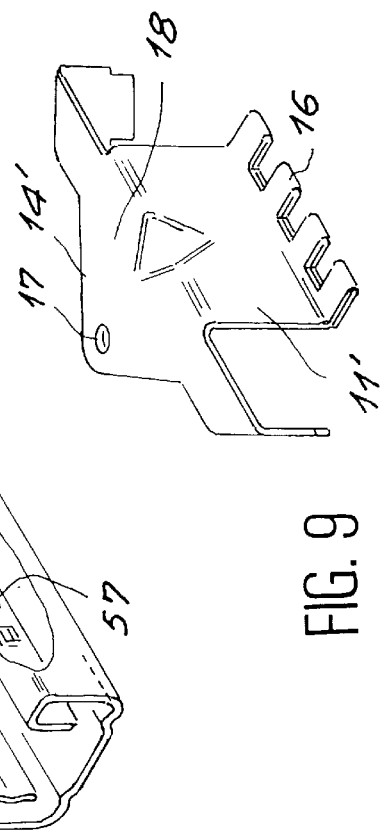

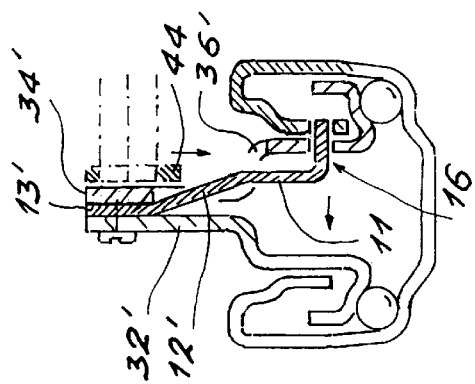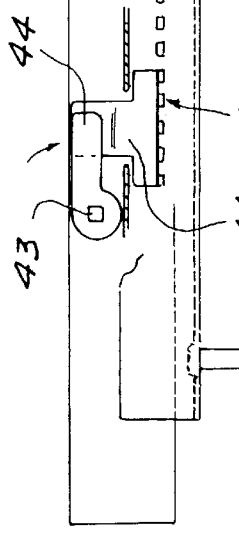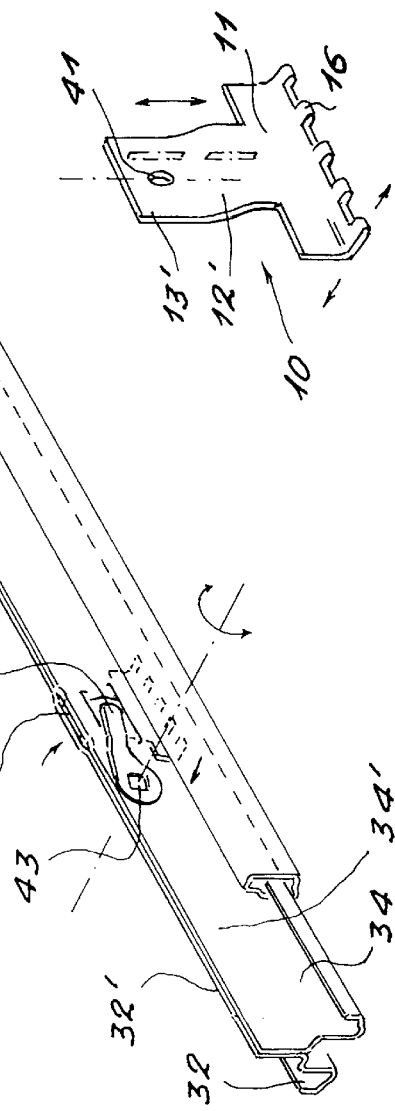

SLIDE LOCKABLE POSITION FOR AUTOMOBILE VEHICLE SEATS

FIELD OF THE INVENTION

The present invention concerns a slide lockable in position for automobile vehicle seats, especially the front seats. These seats are installed on slides to allow adjustment of longitudinal position and it must be possible to lock them, irrespective of their adjustment positions, to avoid all longitudinal movement.

BACKGROUND OF THE INVENTION

We already know of various locking systems, commonly based on the principle of the engagement of a lock attached to the mobile part of the slide. This mobile part is attached to the seat, and notches are made in the fixed part that is attached to the floor of the vehicle. The lock is conventionally held in locked position, engaged with the said notches, by spring return means, unlocking being controlled by a lever which when operated disengages the lock from the notches and thus allows the slide to move and its position adjusted.

We also know, especially by document EP-A-117131, of slides made of a male section and a female section sliding one inside the other. The male section, which is generally U-shaped, includes on one side, forming an arm of the U, a set of notches in which, in locked position, the teeth or crenelations of a lock, attached to the female section, engage. This lock is installed so as to pivot around its center section on a shaft whose axis is parallel to sliding direction and held onto the bottom of the female section by a support. One side of the lock penetrates into the slide through an opening made in the bottom of the U forming the female section and houses at its end the said teeth, oriented in a direction perpendicular to the side of the male section including the locking notches, the teeth moving therefore substantially in this direction when the lock is rotated. A first return spring holds the lock in locked position. Unlocking is ensured by a lever hinged on a trunnion attached to the side of the female section. This lever includes a lug acting on the other end of the lock, located outside the slide, to pivot the lock in opposition to the return spring and disengage its teeth from the notches in the male section. This lever is returned to position by a second return spring.

The disadvantage of this system lies in the presence of many parts (support, hinge pin, springs), which complicates the installation and increases the costs.

BRIEF DESCRIPTION OF THE INVENTION

The aim of the invention is to simplify the production of such locking systems, by reducing the number of parts required.

With these targets in mind, the subject of the invention is a slide for vehicle seats, of the type including a first and second section sliding in relation to each other in a longitudinal direction and a longitudinal blocking lock installed so as to pivot on the first section around an axis positioned in the said longitudinal direction. The lock is equipped with locking teeth which mate with the notches made in the second section to perform locking and which can be disengaged from the notches by a movement in a direction perpendicular to the longitudinal direction. According to the invention, the slide is characterized in that the lock is securely attached to the first section in an attachment area far from the teeth and it is elastically deformable in an intermediary area located between the attachment area and the teeth.

Thus, the installation of the lock requires no hinged parts or added return springs. The pivoting of the lock to disengage its teeth from the notches of the second section is obtained by the elastic deformation of the intermediary part and it is the elasticity of this part which ensures return to locked position.

Preferably, the lock is formed of a single part consisting of a blade made from an elastic material, for example spring steel. The locking teeth are thus made directly in this blade which greatly facilitates the manufacture of the lock. Moreover, the blade is placed on the inside of the slide. In this way, the locking elements are protected by the slide and the size of the slide system is limited to the outer profile of the slides.

According to a first embodiment, the lock consists of a lock body including the teeth and the elastically deformable intermediary area is formed of two lugs which extend laterally on either side of the body and which are attached by their ends away from the body to the first section, the pivoting then being achieved by the torsion of the said lugs.

Unlocking is then preferably achieved by acting, by control means such as a bar or tension cable, on a tab made with the lock in a single piece and which extends from the end of the lock body opposite the teeth.

According to a second embodiment, the lock consists of a lock body including the teeth. The elastically deformable area is formed by a lug which extends from the said body opposite the teeth and which is attached by its end to the first section, the pivoting being then achieved by the bending of the lug.

In this case, the control means act directly on the lock body and can for example consist of a cam installed so as to pivot on the first section.

Other characteristics and advantages of the invention will be given in the description which follows.

Refer to the appended drawings on which:

BRIEF DESCRIPTION OF THE FIGURES

FIG. 1 shows a perspective view of a slide in compliance with the first embodiment, that is with the lock attached by lateral lugs and in a first variant with unlocking by a bar;

FIG. 2 shows a detailed view of the lock;

FIG. 3 shows a cross section view, at lock level, of the slide of FIG. 1;

FIG. 4 shows a detailed sectional view of the locking teeth;

FIG. 5 shows a view similar to that of FIG. 1, of a second design variant with unlocking by a cable;

FIG. 6 shows a perspective view of the blade forming the lock in this second variant;

FIG. 7 shows a cross section view of the slide of FIG. 5.

FIG. 8 shows a perspective view of a slide according to the third design variant;

FIG. 9 shows a perspective view of the blade forming the lock of the third variant;

FIG. 10 shows a cross section view of the slide of FIG. 8;

FIG. 11 represents another design of the lock usable for the third variant;

FIG. 12 shows a detailed view of the teeth of the lock in locked position;

FIG. 13 shows a side view with a cutaway of a slide according to the second embodiment, that is with a blade deformable by bending and unlocking by a pivoting cam;

FIG. 14 shows a perspective view of the slide of FIG. 13;

FIG. 15 shows a perspective view of the blade forming the lock in this second embodiment;

FIG. 16 shows a cross section view of the slide of FIGS. 13 and 14.

Slide 1 shown on FIG. 1 is formed of a male section 3 sliding in a female section 5. A seat is conventionally equipped with two such slides. The female sections 5 are designed to be attached to the floor of a vehicle, and the frame of the seat, not shown, is attached to the male sections 3. A control bar 7, partially shown, is provided to ensure the unlocking of the slides and allow the position of the said seat to be adjusted. As we will see later, unlocking can also be ensured by other means, for example a handle placed laterally on one side of a slide or by a cable control system.

In the variants which will be described, the slides are made in a similar manner for that which concerns their sliding and positioning functions. The female section 5 is generally U-shaped and open at the top, including two flanges 51 folded towards each other and terminated by a hook-shaped section 53 turned towards the inside and the bottom of the section.

The male section 3 is also generally U-shaped, open at the bottom. The flanges 31 of this U extend, outwards and upwards, with a profiled return 33 which engages under the hook-shaped section 53 of the female section. The profiled returns 33 and the rounded inside angles 55 between the bottom of the U of the female section and its flanges 51 constitute the raceways for balls 4 placed between sections 3 and 5 to facilitate their sliding in relation to each other. Notches 57 are made in the outer edges of the hook-shaped sections 53 and are uniformly spaced over at least a part of the length of the female section 5, the said outer edges being adjacent to the flanges 31 of the male section in the hollow formed between the two said flanges and the corresponding profiled return 33.

The description above applies to the various designs and variants of the slides in compliance with the invention. The form of the sections and their relative arrangement to achieve the sliding of one section in relation to the other, could be modified without falling outside the scope of this invention.

By referring specifically to FIGS. 1 to 4, we will now describe the locking system used in the first variant of the first embodiment.

The male section is formed of two elements 32, 34 with the same profile, arranged symmetrically around a vertical longitudinal mid plane and assembled to each other by a part of the edge to form an upper flange 38 which extends vertically upwards from the bottom 35 of the said section.

A window 36 is made in the bottom 35 of the male section 3 through which passes a lock 10. The lock 10 consists of a blade made of an elastically flexible material with good mechanical strength, especially shearing strength, for example spring steel. It includes a lock body 11 which extends vertically through the window 36, with sufficient clearance to allow the pivoting of the lock to unlock the slide, as we can see later. The lock body includes on its lower edge, located inside the slide, locking teeth 16 which extend at right angles to the body and are therefore more or less horizontal. As we can see better on the drawings of FIGS. 2 and 4, the teeth 16 are cut into the lower edge of the blade forming the lock, bent at right angles in relation to the lock body and folded back over themselves to increase their shear strength.

The teeth 16 pass through a second window 37 made in one of the flanges 31 of the male section, with minimum clearance in the slide longitudinal direction, and engage, in locked position, in the notches 57 in the female section.

Thus, in slide locked position, as shown especially on FIG. 4, the loads tending to make the male section slide in the female section are directly transmitted from the male section to teeth 16 (via the lateral edges of window 37) and from these to the notches 57 of the female section and, on account of the nearness of the notches to flanges 31 of the male section, lead to stresses in the blade which are solely shear stresses. The other parts of the lock 10 are submitted therefore to no stresses when such loads are exerted and, consequently, the size and the weight of the lock can be in particular reduced.

In another form of the design, shown on FIG. 12, the window 37, through which the set of teeth passes can be replaced by a number of windows 37' corresponding to each tooth of the lock respectively. In this case, the shear loads between the male section and the lock are taken by all the teeth.

The lock includes, in its upper part located above bottom 35 of the male section, two lugs 12 which extend laterally on either side of the body 11, in the plane of the latter. The ends 13 of the lugs 12 are folded more or less at right angles to this plane and attached to the upper flange 38 of the male section, for example by inserting them into the holes 39 made in the said flange 38 and by peening or folding over the outer edges of the lugs on the other side of the flange 38 to secure the lock to the male section.

A tab 14 extends from the upper edge of lock body 11, more or less at right angles to the latter and on the same side of lock body general plane as the teeth, and a stiffener 15 is formed to guarantee the stiffness of this tab in relation to the lock body.

To unlock the slides and allow the longitudinal adjustment of the seat, the slide system includes unlocking means consisting, according to the first design variant, of a bar 7 formed, for example by a tube bent in a U shape, each arm 71 of which extends near to the upper flange 38 of the male section 3 and is held by a pivot 72, made for example of a plastic material. A slot 73 is made in the wall of the tube near to the end of the arm 71 and the tab 14 of lock 10 is partially inserted into slot 73 with clearances as tight as possible which can be practically eliminated thanks to the triangular shape, which can be seen on the figures, of the said tab and the elasticity of the bar.

The unlocking of the slide is achieved by pulling the bar upwards, which causes the end of arm 71 to pivot downwards. The vertical load F thus exerted on tab 14 pivots the lock around an axis located at the level of lugs 12 and thus causes the disengagement of teeth 16 from the notches 57 as shown on FIG. 3. The dimensions of window 36 and the distance between the lock body and the upper flange 38 of the male section are determined so that the lock will have sufficient travel to allow the teeth to disengage from the notches 57.

The torsion, thus caused on the said lugs, creates a spring return torque which return the lock to the locked position as soon as the bar is released.

In the second variant, shown on FIGS. 5 to 7, the locking of the slide is ensured in the same way as in the first variant. The lock body and its attachment to the male section are also the same. Only the tab 14' is positioned in opposite direction in relation to the first variant, that is it extends here on the other side from the teeth with respect to the general plane of the lock body. The tab 14' passes freely into an opening 63 in upper flange 38 of the male section and includes a hole 17 acting as attachment point for tension unlocking means 61 such as a cable or an unlocking pull rod. It is then this tension F' exerted on the tab 14' which causes the pivoting of the lock for unlocking.

In the third variant, shown on FIGS. 8 to 11, the male section consists of a single part and has then a flat bottom 35 to which the lock is attached. In this case, the lock body 11' is itself bent more or less at right angles, its upper part 18, prolonged by the tab 14', extends in a horizontal plane parallel to bottom 35. Lugs 12 extend in the same horizontal plane and their ends are folded downwards and attached to bottom 35 in the same way as in the first two variants.

The drawing on FIG. 11 represents another design for the lock also adapted for attaching it to the bottom of the male section. This shape is similar to that of the lock used in the second variant, except for the ends of the lugs which are shaped so that they can be attached to the bottom of the male section.

We will see that preferentially, as shown in the different variants of the first embodiment described above, the ends of the lugs are folded obliquely in relation to the direction in which lugs 12 extend. It follows that the said lugs have one edge shorter than the other. When the lugs are deformed by torsion, it is therefore near the longer edge that deformation is maximum, the pivoting axis being located on the side where the lugs are shorter and therefore more rigid. This arrangement therefore allows pivoting axis A (see FIG. 2) to be positioned in the most adequate manner.

In relation to FIGS. 13 and 16, we shall now describe the second embodiment where the pivoting of the lock body and its spring return to locked position are ensured by elastic bending of the blade which constitutes the lock.

In this second embodiment, the male section 3 consists, as in the first two variants shown on FIGS. 1 to 5, of two symmetrical elements 32, 34 whose upper edges 32', 34' are joined together for example by welding, and form the upper flange 38 of the male profile. The lock body 11 passes through window 36' which is made in the bottom of the male section and which is extended on a part of the upper edge of one of the elements forming the said male section. Lock body 11 is extended upwards, on the side opposite teeth 16, by a lug 12' whose upper end 13' is offset laterally in relation to the lower part of the lock body. Lug 12' therefore extends obliquely in relation to its fixed end 13' as we can clearly see on FIG. 16.

The end 13' of lug 12' is securely held in the male section by being inserted into an opening 40 obtained at the jointing plane of the edges of the two elements 32, 34 by a hollow stamping in these edges, and it is retained for example by a half-cut of one of the said elements which enters into a hole 41 made for this purpose in the end of the lug.

When the blade constituting the lock is thus attached to the male section, without submitted to elastic deformation stresses, the teeth 16 enter into notches 57 in the female section to ensure locking, as described in the other designs.

A cam 43 is installed, pivoting on an axis transverse to the slide, on the upper flange 38 of the male section 3, near to the lock. The tip 44 of the cam extends parallel to the said flange 38, in front of the lug 12'. When cam 43 is pivoted, for example by an operating square equipped with a control handle placed beside the seat (not shown), the tip 44 bears on the lug 12' and, on account of the obliqueness of the latter, pushes the lock body 11 horizontally towards the inside of the slide by elastically deflecting the lug 12', which causes unlocking by disengaging teeth 16 from notches 57. When the cam returns to its original position, for example, as known per se, by means of a torsion spring installed on the operating square, the lock is elastically returned to its locked position.

The invention is not limited to the different variants given above only as examples and includes all combinations of the various types of lock attachment to the male section and of the various types of unlocking control.

The notches 57 of the female section could also, instead of being made of holes cut into profiled section 53 of the female section flange, be in the form of crenelations made directly on the edge of this profiled section.

I claim:

1. Slide for vehicle seats comprising first and second sections slidings in relation to each other in a longitudinal direction; and a longitudinal blocking lock configured as an elastic blade and installed so as to pivot on the first section around an axis oriented in the said longitudinal direction, the lock being equipped with locking teeth which mate with notches made in the second section to ensure the locking and which can be disengaged from the said notches by movement along a direction perpendicular to the said longitudinal direction, wherein the lock is securely attached to the first section in an attachment area far from the said teeth and is elastically deformable in a intermediary area located between the attachment area and the teeth; and further wherein the lock has a lock body including teeth and the said elastically deformable intermediary area is formed of two lugs which extend laterally on either side of the body and which are attached by their ends far from the body onto the first section, the pivoting of the lock being achieved by torsion of the said lugs.

2. Slide according to claim 1, wherein the ends of the lugs are bent obliquely.

3. Slide according to claim 1, further comprising unlocking means acting on a tab made with the lug from a single piece and which extends from the end of the lock body opposite to the teeth.

4. Slide according to claim 3, further comprising tension unlocking means attached to the tab.

5. Slide according to claim 3, wherein the unlocking means include a bar hinged on the first section and the tab is inserted in a slot made in the said bar.

6. A slide for vehicle seats comprising:

a first section;

a second section slidably engaged with the first section along a longitudinal direction;

locking means for normally blocking longitudinal displacement of the sections relative to one another, the locking means fixedly attached at a first portion thereof to the first section and selectively pivoting thereon, around an axis oriented along the longitudinal direction;

teeth formed on a second portion of the locking means, remote from the fixedly attached first portion, for normally mating with notches formed in the second section to block longitudinal displacement of the sections;

actuator means connected to the locking means for disengaging the teeth from the notches in a motion perpendicular to the longitudinal direction; and a third portion of the locking means, intermediately and integrally positioned between the first and second portions, the third portion being elastically deformable to normally bias the teeth into engagement with the notches, the locking means further comprising a central body including the three portions; and further wherein the third and deformable portion includes two lugs that project laterally on both sides of the body, that extend outwardly to the first portion, that are attached at their ends to the first section, the pivoting of the locking means being achieved by torsion of the lugs.

7. A slide in accordance with 6 wherein the lugs include oblique bends therealong to separate the first and third portions.

8. A slide in accordance with claim 6 wherein the locking means is a single member further comprising a tab that extends from an end of the body that is opposite to the second portion that bears the teeth.

9. A slide in accordance with claim 8 wherein the actuator means further comprises a bar hinged on the first section; and further wherein the tab is located in a slot formed in the bar.

10. A runner for a vehicle seat having first and second profiled members sliding with respect to each other in a longitudinal direction and comprising:
    a longitudinal shear resistant clamping latch mounted to the first profiled member that is provided with locking teeth which removably engage notches formed in the second profiled member in order to ensure locking of the profiled members, the teeth being disengageable from the notches by a movement of the teeth in a direction perpendicular to the longitudinal direction;
    the latch being fixed on the first profiled member in a fixing zone, distant from the teeth, and being elastically deformable in an intermediate zone situated between the fixing zone and the teeth;
    the teeth passing through corresponding apertures formed in a flange on the first profiled member when the teeth engage the notches formed in the second profiled member;
    the apertures situated in overlying alignment with corresponding notches on the second profiled member thereby limiting stresses in the latch to shear stresses when the teeth engage the notches and apertures.

11. The runner set forth in claim 10 wherein the latch is formed as a single metal blade made of elastic material.

12. The apparatus set forth in claim 10, the latch further comprising:
    a latch body bearing the teeth and further wherein the elastically deformable intermediate zone is formed at a lug portion of the body that is spaced from the teeth and which is fixed at an outward end of the lug portion, opposite the teeth, to the first profiled member;
    pivoting of the latch resulting from bending of the lug portion.

13. The runner set forth in claim 12 further having latch release means comprising:
    a cam pivotally mounted to the first profiled member and having a tip for contacting the lug portion and causing pivoting of the latch.

14. The runner set forth in claim 12 further comprising:
    a top flange formed in the first profiled member, and a recess formed in the flange for receiving the outward end of the lug portion.

15. The runner set forth in claim 10, the latch further comprising:
    a latch body bearing the teeth and further wherein the elastically deformable intermediate zone is formed by two lugs extending laterally on each side of the body and which are fixed to the first profiled member at the ends of the lugs, spaced from the body;
    pivoting of the latch resulting from twisting of the lugs.

16. The runner set forth in claim 15 wherein the lug ends are folded obliquely.

17. The runner set forth in claim 15 further comprising a tongue integrally connected to the body of the latch, at an end opposite the teeth; and unlocking means for displacing the tongue and thereby disengaging the teeth.

18. The runner set forth in claim 17 wherein the unlocking means includes a bar connected to the first profiled member; and further wherein the tongue is inserted into a slot formed in the bar to form a moveable linkage between the bar and the latch.

19. The runner set forth in claim 18 wherein the unlocking means includes traction means attached to the tongue for displacing the tongue and thereby disengaging the teeth.

* * * * *